Dec. 15, 1970 D. R. MAURE 3,548,375

BINARY CODE CHECKING ARRANGEMENT

Filed Feb. 21, 1968

INVENTOR.
DOUGLAS R. MAURE
BY
Christie, Parker & Hale
ATTORNEYS

United States Patent Office 3,548,375

Patented Dec. 15, 1970

3,548,375

BINARY CODE CHECKING ARRANGEMENT

Douglas R. Maure, San Marino, Calif., assignor to Lear Siegler, Inc., Santa Monica, Calif., a corporation of Delaware Filed Feb. 21, 1968, Ser. No. 707,269
Int. Cl. G06f *11/10*
U.S. Cl. 340—146.1 14 Claims

ABSTRACT OF THE DISCLOSURE

Binary code characters are generated with a plurality of digits, a maximum number of which are allowed to have a given binary value. A binary code check for each character is generated to represent a number that adds to the number of digits of the character with the given binary value to form a constant sum equal to the maximum number. Preferably, the check is binary coded with the digits weighted according to a geometric progression of two. To verify the correctness of each character, it and its check are decoded, the character digits being weighted equally and the check digits being weighted according to a geometric progression of two. If a number is obtained in decoding that is different from the maximum number, an error has occurred in the generation of the character.

BACKGROUND OF THE INVENTION

This invention relates to checking the correctness of binary code characters and, more particularly, to a code checking arrangement that is particularly well suited for detecting the simultaneous depression of two or more keys on a keyboard type binary code character generator.

Many different techniques are known for detecting and correcting binary code characters. In general, these techniques utilize a particular property in the binary code that changes when an error is present and apparatus for monitoring this property in each binary code character. One code checking technique especially prevalent in connection with information storage on magnetic tape prescribes odd or even parity for the number of digits in a character having one binary value. In each character a special digit is assigned to parity. The parity digit is given a value that provides the prescribed parity relationship in conjunction with the other digits of the character. For example, in the binary code character, 0010011, the parity digit would be "1" in an even parity system and, "0" in an odd parity system.

Another binary code checking technique, which is common in the telephone switching art, employs a code that always has the same number of digits with a particular binary value such as the two-out-of-five code. In the two-out-of-five code, for example, each character has five digits, two digits with one binary value and three digits with the other binary value. The particular character designated by the code depends upon which two digits have the one binary value. Ten different character combinations are possible in this two-out-of-five code.

The known code checking techniques are not generally suitable for detecting the simultaneous depression of two or more keys on a keyboard type binary code character generator. Such apparatus is typified by a abandoned application of John T. Linker and Douglas R. Maure, entitled Optical Encoding Device, Ser. No. 481,602, filed Aug. 23, 1965, and assigned to the assignee of the present application. The depression of two or more keys may result in the generation of an erroneous code character that may just as likely have an even number of excessive digits of one binary value as an odd number. Thus, a parity check of the generated code characters is not effective because it only detects the presence of an odd number of excessive digits of one binary value. Moreover, a two-out-of-five code is not practical because most keyboards are employed in connection with the generation of a full complement of alpha-numeric characters. All the alpha-numeric characters can be generated in a standard binary code having seven digits exclusive of digits used for code checking. The application of the principle of the two-out-of-five code to an alpha-numeric character code requires more than twice the number of digit places as the standard code. This unduely increases the equipment required to generate, transmit, and handle the resulting code characters.

Accordingly, special mechanical and electronic lock-out arrangements have been devised to meet the problem of the simultaneous depression of two keys in a keyboard type binary code character generator. The mechanical lock-out arrangements generally involve a large number of moving parts interconnected by complex mechanical linkages. The electronic lock-out arrangements generally involve many components because circuitry individual to each key is provided to detect directly the simultaneously depression of two keys. In neither type of lock-out arrangement is it possible to detect errors arising in the generation of the code characters due to factors other than the simultaneous depression of two keys.

SUMMARY OF THE INVENTION

The invention contemplates a binary code checking arrangement that is particularly well suited for detecting the simultaneous depression of two or more keys on a keyboard type character generator as well as errors in the generated characters caused by other factors. Binary code characters are generated with a plurality of digits, a maximum number of which are allowed to have a given binary value. For each character, a binary code check is generated that represents a number bearing a known relationship to the number of character digits with the given binary value. When each character and its check are monitored, this feature permits the detection of errors in the number of digits of the generated characters with the given binary value. The number represented by the check most advantageously bears the following additive relationship to the number of character digits having the given binary value: The sum of the number represented by the check and the number of character digits having the given binary value is a constant at least as great as the maximum number of digits with the given binary value. When this additive relationship is implemented in a keyboard type character generator, the simultaneous depression of two or more keys can be detected in each and every instance. Preferably, the check number is in binary code with the digits weighted according to a geometric progression of two.

To monitor a character and its check, the digits are decoded, the character digits being weighted equally and the check digits being weighted according to the binary code. If the decoded number equals the constant, a character has been properly generated. If the decoded number is different from the maximum number, two or more keys have been simultaneously depressed and/or the wrong number of digits having the given binary value are present. The described technique provides a meaningful electronic character check without requiring a large number of additional digits or circuitry individual to each key.

The invention can be exploited particularly well in connection with the generation of binary code characters having seven digits and a single parity digit that maintains odd parity. In such case, the maximum number of digits allowed to have a given binary value is seven. In order to form the binary code check, only two additional digits are necessary, one weighted for a binary value of two and the other weighted for a binary value of four.

BRIEF DESCRIPTION OF THE DRAWING

The features of a specific embodiment of the invention are illustrated in the drawing, in which.

DESCRIPTION OF A SPECIFIC EMBODIMENT

For the purpose of explaining the invention, it is assumed that binary code characters having eight digits are involved. Each character has seven digits actually representing the particular character and one digit that is employed to maintain odd parity of the binary values for the eight digits associated with a character. The binary values the digits can assume are designated "0" and "1." The maximum number of binary "1's" allowed by this coding scheme is seven and the minimum number of binary "1's" allowed by the coding scheme is one. (Eight binary "1's" or no binary "1's" would violate the requirement for odd parity.) In addition, two binary code check digits are provided for each character. The binary values of these check digits represent in a binary code the correct number of binary "1's" in the eight character digits. The first digit is weighted at a value of two and the second is weighted at a value of four. The binary values of the check digits for each character are selected so the sum of the number of digits of the character having binary "1's" and the number represented by the check digits equals the constant seven. For example, the binary code character 00000001 has the check digits 11, the first check digit being weighted at a value of two and the second check digit being weighted at a value of four; the character 00001011 has the check digits 01; the character 01101011 has the check digits 10; and the character 11111110 has the check digits 00. If for some reason, the wrong number of binary "1's" appear in the character or the check, the sum of the number of "1's" and the number represented by the check digits will not equal seven. Accordingly, the correctness of the character is checked by decoding the digits of the character and its check, the character digits all being weighted at a value of one and the check digits being weighted at a value of two and four, respectively. It is important to note that the additive relationship between the number of binary "1's" in each character and the number represented by its check prevents the possibility of the simultaneous depression of two keys of a keyboard type character generator going undetected. If the simultaneous depression of two keys increases the number of binary "1's" in the digits of the resulting character at the output terminals of the generator, the decoded number will be larger than seven. If the simultaneous depression of two keys does not increase the number of binary "1's" in the digits of the resulting character at the output terminals of the generator, then it must increase the number of binary "1's" in the check digits, so the decoded number will again be larger than seven.

Figure 1:
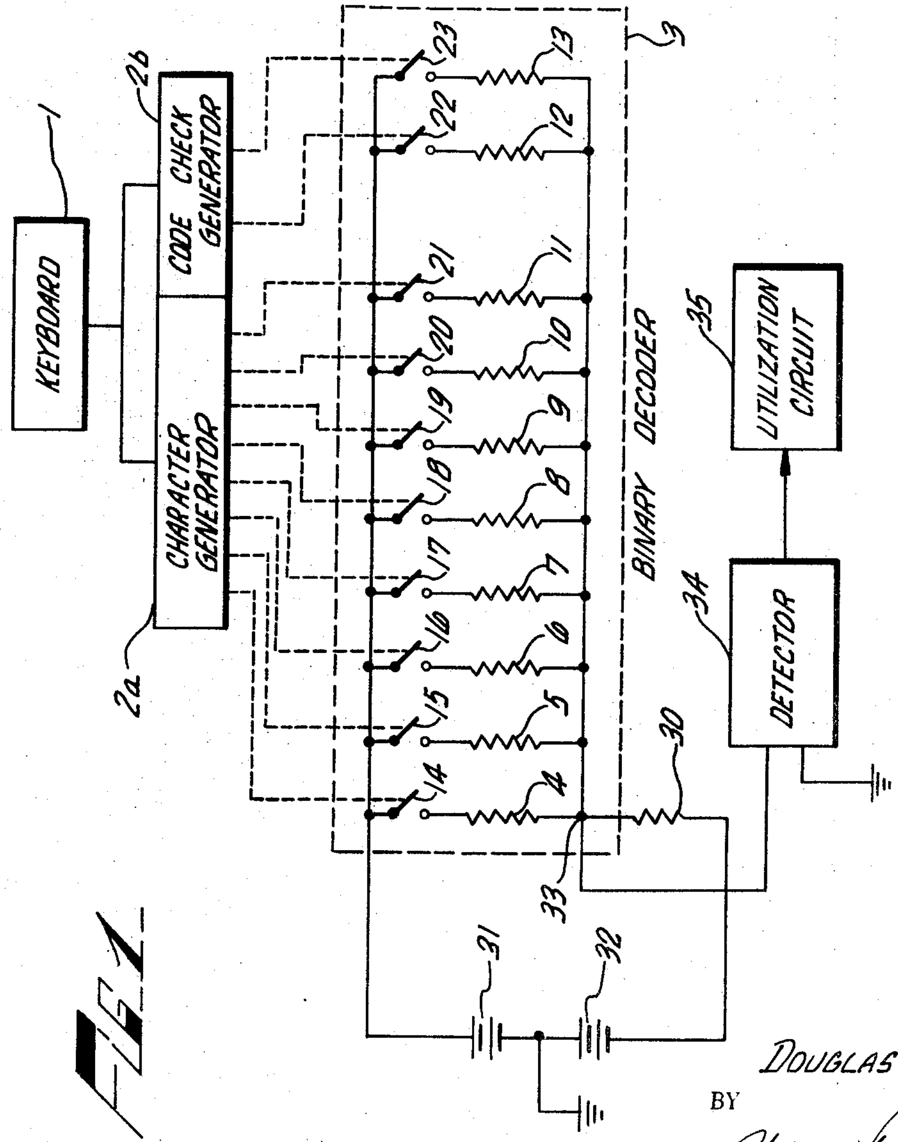
FIG. 1 is a circuit schematic diagram partially in block form of a binary code checking arrangement incorporating the principles of the invention.

In FIG. 1, a keyboard 1 is shown that actuates a character generator 2*a* and a code check generator 2*b*. Generators 2*a* and 2*b* are represented by contiguous blocks to signify that they operate together to produce character and check digits exhibiting the relationship described in the preceding paragraph. Assuming for example that the invention is to be employed with the keyboard type character generator disclosed in the copending application mentioned above, Ser. No. 481,602, code check generator 2*b* could be implemented by providing two additional shutter positions on the central core of each plunger. The presence of a shutter at either or both of the additional positions on the core designates a binary "1" for the corresponding check digit. Each light deck disclosed in this copending application would also be modified by providing two more lamps in the lamp bank, two more light paths for the additional lamps, and two more photocells in alignment with the light paths. In the course of the assembly starting with a central core having ten shutters, the appropriate shutters for the check digits are removed from the core at the same time as the shutters for the character digits. Thus, each time one of the plungers is depressed by its key, the shutters present on the central core produce binary "1's" exhibiting the proper relationship between the digits of the character and the check.

As illustrated in FIG. 1, a binary decoder 3 comprises resistors 4, 5, 6, 7, 8, 9, 10, 11, 12, and 13 connected in series with normally open switches 14, 15, 16, 17, 18, 19, 20, 21, 22, and 23, respectively. The series combinations of switch and resistor are all connected in parallel. The states of switches 14 through 21, respectively, depend upon the binary values that the character digits assume as a character is being produced by generator 1. This is depicted by the dashed lines interconnecting character generator 2*a* and switches 14 through 21. Similarly, the states of switches 22 and 23 are determined by the binary values that the check digits for the generated character assume. This is depicted by the dashed lines interconnecting character generator 2*b* and switches 22 and 23. When the binary value of a digit is "0," the corresponding switch is open as shown in FIG. 1, and when the binary value of a digit is "1," the corresponding switch is closed. Resistors 4 through 11 each have a resistance of R, resistor 12 has a resistance of $R/2$, and resistor 13 has a resistance of $R/4$. When a correct code is generated, switches 14 through 23 are selectively closed such that the total equivalent resistance of binary decoder 3 is $R/7$. For example, switches 21, 22, and 23 or switches 19, 20, 21, and 23 might be closed at the same time in the course of the generation of a character. Binary decoder 3 forms one leg of a bridge network. The other legs of the bridge network are formed by a resistor 30, a battery 31, and a battery 32, respectively. Batteries 31 and 32 have the same terminal voltage drops. The negative terminal of battery 31 is connected to ground and its positive terminal is connected to binary decoder 3. The positive terminal of battery 32 is connected to ground and its negative terminal is connected to resistor 30. Resistor 30 and the binary decoder 3 are connected together at a node 33. The resistance of resistor 30 is $R/7$. Therefore, as long as switches 14 through 23 are selectively closed so the equivalent resistance of binary decoder 3 is $R/7$, the bridge network is balanced and node 33 is at ground. If the digits of a generated character and/or check have too many binary "1's," the equivalent resistance of binary decoder 3 is reduced and the potential at node 33 becomes negative. On the other hand, if the digits of a generated character and/or check have too few binary "1's," the equivalent resistance of binary decoder 3 is increased and the potential at node 33 becomes positive. Node 33 is coupled to the input of a detector 34, which could comprise the circuit disclosed in Arnold Pat. 3,319,084, issued May 9, 1967. Detector 34 produces a signal at its output that indicates whether node 33 is at a positive potential, a negative potential, or ground potential. A utilization circuit 35 functions responsive to the output signal of detector 34. Utilization circuit 35 could be a lock-out arrangement for preventing the appearance of a character at the output terminals of the character generator, an alarm circuit, or circuitry for initiating a program in a computer. Utilization circuit 35 takes the appropriate action whenever detector 34 senses a decoded number that deviates from seven.

Figure 2:
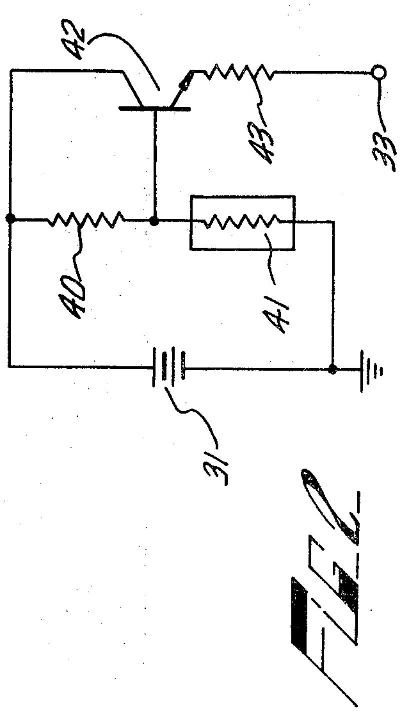
FIG. 2 is a circuit diagram of one of the switches represented schematically in FIG. 1.

Switches 14 through 23 are represented in FIG. 1 schematically. Each of these switches could comprise the transistor switch shown in FIG. 2. A resistor 40 and a photocell 41 associated with the particular digit involved are connected in series across battery 31. The collector of a NPN transistor 42 is connected to the positive terminal of battery 31; the base of transistor 42 is connected to the junction of resistor 40 and photocell 41; and the emitter of transistor 42 is coupled by a resistor 43 to node 33. When the value of the digit is a binary "0," light is incident upon photocell 41. Thus, the resistance of photocell 41 is much smaller than the resistance of resistor 30, and transistor 42 is cut off. This corresponds to the open state of the switch. When the value of the digit is a binary "1," no light is incident upon photocell 41 and its resistance is essentially infinite. Thus, transistor 42 is forward biased. This corresponds to the closed state of the switch.

The invention has broad applicability. It can be practiced with characters having any number of digits, with even parity, or with no parity. In addition, the check digits can be weighted in some other fashion and the sum of the number of character digits having binary "1's" and the number represented by the check digits can be some constant larger than seven. Finally, the code checking technique can be employed in other systems than a keyboard type character generator.

What is claimed is:

1. A binary code checking arrangement comprising:

means for generating binary code characters with a plurality of digits each having one of two binary values, there being a maximum number of digits of a properly generated character having a given binary value;

means for generating a binary code check for each generated character, the check comprising a plurality of digits having binary values that represent a number that adds to the number of digits of the generated character having a given binary value to form a constant sum at least as large as the maximum number; and means for monitoring each character and its corresponding check for the constant sum.

2. The arrangement of claim 1, in which the check digits are weighted in accordance with a binary code.

3. The arrangement of claim 2, in which the characters each have eight digits, seven of the eight digits have binary values that actually represent a particular character, one of the eight digits has a binary value that maintains odd parity for the eight digits, the check comprises two digits weighted at two and four, respectively, and the maximum number is seven.

4. A binary code checking arrangement comprising:

means for generating binary code characters with a plurality of digits each having one of two binary values;

means for generating a binary code check for each generated character, the check comprising a plurality of digits having binary values that are weighted in accordance with a binary code and represent a number bearing a known relationship to the number of digits of a generated character having a given binary value;

means for monitoring each character and its corresponding check for the known relationship, the monitoring means decoding the digits of each character and its corresponding check with the character digits weighted equally and the check digits weighted in accordance with the binary code; and means for giving an indication when the decoded digits deviate from a constant value.

5. The arrangement of claim 4, in which the monitoring means comprises a resistor and a switch connected in a series combination for each character and check digit, the resistor for each character digit has a resistance R, the resistor for each check digit has a resistance R divided by the binary weighting of the digit, the state of each switch depends upon the binary value of the corresponding digit, and the series combinations of the switches and the resistors are connected in parallel.

6. The arrangement of claim 5, in which the generated characters have a maximum number of digits with a given binary value, the known relationship is that the sum of the number of digits of the generated character having one binary value and the number represented by the check digits is equal to a constant at least as large as the maximum number, first and second direct current voltage sources are connected together in series aiding relationship, a balancing resistor and the monitoring means are connected in series across the first and second sources, the junction between the first and second sources is connected to ground, a balancing resistor has a resistance R divided by the constant, and means are provided for sensing the voltage at the junction of the monitoring means and the balancing resistor.

7. The arrangement of claim 6, in which the sensing means actuates a utilization circuit when the voltage at the junction of the monitoring means and the balancing resistor leaves ground.

8. A binary code checking arrangement comprising:

means for generating binary code characters having a plurality of digits, a maximum number of which are allowed to have a given binary value;

means for generating a binary code check for each character, the check having digits with such binary values as to form a sum equal to a constant at least as large as the maximum number when added to the digits of the character, the digits of the check being weighted at least in part according to a geometric progression of two and the digits of the character being weighted equally; and means for decoding the digits of each generated character and its check weighted consistent with the generation of the check.

9. An arrangement for detecting the simultaneous depression of two keys on a keyboard type binary code character generator comprising:

means responsive to the depression of each key for generating a binary code character having a plurality of digits with one of two binary values and a binary code check for the character, the character having a maximum number of digits with a given binary value and the check digits having binary values that represent a number that adds to the number of digits of the character having the given binary value to form a constant sum at least as large as the maximum number; and means for monitoring for the constant sum the character and its check generated responsive to the depression of each key.

10. The arrangement of claim 9, in which the check digits represent the number in a binary code, the check digits being weighted at least in part according to a geometric progression of two.

11. The arrangement of claim 9, in which each binary code character has eight digits, seven of the eight digits have binary values that actally represent a particular character, one of the eight digits has a binary value that maintains odd parity for the eight digits, the check has two digits weighted at two and four, respectively, and the maximum number is seven.

12. The arrangement of claim 11, in which the monitoring means decodes the character and check digits with the character digits weighted at one, one check digit weighted at two, and the other check digit weighted at four.

13. The arrangement of claim 12, in which the monitoring means produces an indication when the decoded digits deviate from seven.

14. The arrangement of claim 9, in which the monitoring means decodes the character and check digits with the character digits being weighted equally and the check digits being weighted to form a constant sum with the number of character digits having the given binary value.

References Cited

UNITED STATES PATENTS

| | | | |
|---|---|---|---|
| Re. 24,447 | 3/1958 | Bloch | 340—146.1 X |
| 2,484,226 | 10/1949 | Holden | 340—146.1 X |
| 2,689,950 | 9/1954 | Bayliss et al. | 340—146.1 X |
| 3,208,042 | 9/1965 | Haigh et al. | 340—146.1 X |

MALCOLM A. MORRISON, Primary Examiner

C. E. ATKINSON, Assistant Examiner

U.S. Cl. X.R.

235—153